United States Patent
Elgimiabi et al.

(10) Patent No.: US 11,091,629 B2
(45) Date of Patent: Aug. 17, 2021

(54) HOT/WET RESISTANT LOW DENSITY EPOXY COMPOSITIONS

(71) Applicant: 3M INNOVATIVE PROPERTIES COMPANY, St. Paul, MN (US)

(72) Inventors: Sohaib Elgimiabi, Dusseldorf (DE); Frank Neuroth, Cologne (DE)

(73) Assignee: 3M Innovative Properties Company, St. Paul, MN (US)

( * ) Notice: Subject to any disclaimer, the term of this patent is extended or adjusted under 35 U.S.C. 154(b) by 51 days.

(21) Appl. No.: 16/342,286

(22) PCT Filed: Dec. 7, 2017

(86) PCT No.: PCT/US2017/065034
§ 371 (c)(1),
(2) Date: Apr. 16, 2019

(87) PCT Pub. No.: WO2018/106875
PCT Pub. Date: Jun. 14, 2018

(65) Prior Publication Data
US 2020/0056036 A1    Feb. 20, 2020

(30) Foreign Application Priority Data
Dec. 9, 2016   (EP) .................................. 16203127

(51) Int. Cl.
| | |
|---|---|
| *C08L 63/00* | (2006.01) |
| *B29C 44/18* | (2006.01) |
| *C08G 59/42* | (2006.01) |
| *C08K 3/22* | (2006.01) |
| *C08K 3/36* | (2006.01) |
| *C08K 5/00* | (2006.01) |

(52) U.S. Cl.
CPC .............. *C08L 63/00* (2013.01); *B29C 44/18* (2013.01); *C08G 59/4223* (2013.01); *C08K 3/22* (2013.01); *C08K 3/36* (2013.01); *C08K 5/0066* (2013.01); *C08K 2003/222* (2013.01); *C08K 2003/2206* (2013.01)

(58) Field of Classification Search
CPC .............. C08K 3/22; C08K 2003/2203; C08K 2003/2206; C08K 2003/2217; C08K 2003/222; C08G 59/42–4269; C08L 63/00–10; C09D 163/00–10; C09J 163/00–10; C08J 2363/00–10
See application file for complete search history.

(56) References Cited

U.S. PATENT DOCUMENTS

| | | | |
|---|---|---|---|
| 3,404,061 A | 10/1968 | Shane | |
| 3,849,366 A * | 11/1974 | Patrick, Jr. ......... | C08G 59/4021 523/457 |

FOREIGN PATENT DOCUMENTS

| | | |
|---|---|---|
| CA | 2334274 | 8/2001 |
| EP | 2599815 | 6/2013 |
| EP | 2818490 | 12/2014 |
| GB | 1161849 | 8/1969 |
| JP | H11-05827 | 1/1999 |
| KR | 10-2015-0065326 | 6/2015 |
| WO | WO 2010-117669 | 10/2010 |
| WO | WO 2014-210292 | 12/2014 |
| WO | WO 2016-074207 | 5/2016 |

OTHER PUBLICATIONS

Ellis, Chemistry and Technology of Epoxy Resins, 117-143 (1993).
*Airbus Directive ABD 0031*, "Fireworthiness Requirements, Pressurised Section of Fuselage", Issue D, Sep. 2002, section 5.4, 9 pages.
Extended European Search Report for the EP Application No. 16203127.2, dated Jun. 7, 2017, 4 pages.
International Search Report for PCT International Application No. PCT/US2017/065034, dated Mar. 14, 2018, 4 pages.

* cited by examiner

*Primary Examiner* — Kregg T Brooks
(74) *Attorney, Agent, or Firm* — Philip P. Soo

(57) ABSTRACT

The present disclosure provides a curable void filler composition comprising: (a) at least one epoxy resin; (b) at least one epoxy curing agent comprising a carboxylic acid anhydride compound; (c) at least one alkaline oxide and/or at least one alkaline earth oxide.

13 Claims, No Drawings

HOT/WET RESISTANT LOW DENSITY EPOXY COMPOSITIONS

CROSS REFERENCE TO RELATED APPLICATIONS

This application is a national stage filing under 35 U.S.C. 371 of PCT/US2017/065034, filed Dec. 7, 2017, which claims the benefit of EP Patent Application No. 16203127.2, filed Dec. 9, 2016, the disclosures of which are incorporated by reference in their entirety herein.

FIELD

The present disclosure relates to curable void filler compositions, more specifically to the field of epoxy resin based curable void filler compositions. The present disclosure further relates to cured void fillers obtained by curing said curable compositions. In another aspect, the present disclosure relates to a composite article comprising honeycomb cells which voids are filled with the void filler composition as described herein. The present disclosure also relates to a method for producing a composite article. In still a further aspect, the present disclosure relates to the use of the curable void filler compositions as described herein.

BACKGROUND

Transportation vehicles, such as automobiles, watercraft and in particular aircrafts frequently contain low weight materials to reduce fuel consumption. To achieve this purpose, sandwich composites with honeycomb core structures are frequently employed instead of solid structures. Also in the construction of buildings such honeycomb structures have found wide application. Typically, the honeycomb core structure is formed by a metal, e.g. Aluminium, or fibreglass or composites, and the cells between the honeycomb cores are void. The size of the void cells in a honeycomb structure influences the mechanical properties of the structure. The bigger the size the greater the weight reduction but the greater may be the loss of mechanical strength. Void cells in honeycomb structures may typically range from 5 mm up to 10 cm in at least one or all three dimensions. To counteract the potential loss of mechanical strength compared to solid structures, the cells of the honeycomb structure are partially or completely filled with filler materials (core fillers or void fillers).

Epoxy resin based compositions may be used for this purpose, for example those described in WO 2010/117669 A1. The external surfaces of the honeycomb structures are often covered by facesheets, i.e. layers of resins, for example epoxy resins or phenolic resins, to further improve the overall stability of the honeycomb structures. Honeycomb structures covered by facesheets are also termed sandwich composites with a honeycomb core. Composite materials, in particular prepregs (preimpregnated fibers) are increasingly used as face sheets because of their good fire retardant properties which are particularly important for applications in the aerospace industry.

Furthermore, materials suitable for applications in the aerospace industry and in particular for aircraft interiors need to meet a highly demanding property profile. This includes, inter alia, good mechanical properties and high compressive strength a high flame retardation and low emission of smoke and toxic fumes when burning while also being low-weight. Thus, composite structures comprising a honeycomb structure including voids filled with a void filler and covered on both sides with prepregs are very common in aerospace applications. In particular, due to their outstanding flame-smoke-toxic (FST) properties, phenolic prepregs are often used in critical aircraft parts.

However, it has been found that during the fabrication process of such composite structures (i.e. comprising honeycomb, prepregs, in particular phenolic prepregs and void fillers) problems may occur. In particular, when being cut or drilled, prepreg delamination or damage in the interfaces with the honeycomb/void filler structure have been observed. Similarly, under hot and wet conditions, delamination defects have been observed. In addition, hot and wet conditions appear to increase defects observed when cutting and drilling the composite structures. Defects of these types may require costly and intensive repair work.

Without contesting the technical advantages associated with the void filler composition known in the art for applications in composite honeycomb structures used in particular in aerospace applications, there is still a strong need for curable void filler compositions exhibiting a certain property profile including good mechanical properties and a certain resistance to delamination when used in combination with prepregs, in particular phenolic prepregs.

Other advantages of the curable void filler compositions and methods of the present disclosure will be apparent from the following description.

SUMMARY

The present disclosure provides a curable void filler composition comprising:
(a) at least one epoxy resin;
(b) at least one epoxy curing agent comprising a carboxylic acid anhydride compound;
(c) at least one alkaline oxide and/or at least one alkaline earth oxide.

The present disclosure also provides a cured void filler, obtained from curing the curable void filler composition as disclosed herein.

Furthermore, the present disclosure provides a composite article comprising a honeycomb structure comprising a plurality of cells filled with a curable void filler composition as described herein or filled with a cured void filler as described herein.

The present disclosure further provides a Method for producing a composite article, comprising
(I) Providing a honeycomb structure comprising a plurality of cells;
(II) Filling said cells of said honeycomb structure with the void filler composition as described herein;
(III) Optionally, covering at least one external surface of said honeycomb structure with at least one layer;
(IV) Curing said void filler composition.

Furthermore, the present disclosure relates to certain uses in applications of the automotive, commercial transportation and aerospace industries.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise.

The terms "solid" and "liquid" refer to ambient conditions (23° C., 1 bar).

Average particle sizes as referred to herein be number averages. In case of particles that are only substantially spherical the particle size is determined by adding the length of the two main (largest orthogonal) axes of the particle and dividing it by two. "Substantially spherical" means one or all main axes (x-, y- or z-axis) may deviate from the required length to form a perfect sphere by up to 50%, preferably up to 25%.

The curable compositions provided herein, preferably, are extrudable pastes. As used above and below, the term "extrudable paste" refers to compositions which have an initial extrusion rate measured as described in the test section below which is at least 50 g/min. More preferably, the initial extrusion rate is from 50 g/min up to 300 g/min.

Unless explicitly stated otherwise, all embodiments and optional features of the present disclosure can be combined freely.

The first aspect of the present disclosure is a curable void filler composition comprising:
(a) at least one epoxy resin;
(b) at least one epoxy curing agent comprising a carboxylic acid anhydride compound;
(c) at least one alkaline oxide and/or at least one alkaline earth oxide.

It has been surprisingly found that a curable void filler composition comprising the combination of above (a), (b) and (c) may provide a property profile useful for aerospace applications. In particular when used as void fillers in honeycomb structures with prepregs such as phenolic prepregs, these curable void filler compositions may exhibit a combination of mechanical strength and a certain resistance to hot/wet conditions as well as an improved delamination resistance, and may also exhibit improved properties when the composite structure is being cut or drilled.

Epoxy Resins:

Epoxy resins are polymeric organic compounds having one or more oxirane ring polymerizable by a ring opening reaction. The epoxy-functionalities allow the resin to undertake cross-linking reactions. Such materials, broadly called epoxides, can be cycloaliphatic or aromatic, which means they have one or more unit that is cycloaliphatic or aromatic. Useful materials generally have at least two polymerizable epoxy groups per molecule and, more preferably, from two to four polymerizable epoxy groups per molecule. Typically, the epoxy resins may have an average epoxy-functionality of at least 1, greater than one, or of at least 2, or from about 1 to 4.

The epoxy resin is preferably free or essentially free of aromatic amine moieties. The term "essentially free" as used herein means that trace amounts may be present, for example, due to impurities present in the starting materials or as a result of production process.

Such trace amounts include less than 10,000 ppm, preferably less than 5,000 ppm, based on the total amount of the composition.

Typically but not exclusively, the epoxy resins contain repeating units derived from monomers having an epoxy-functionality as described above but epoxy resins can also include, for example, silicone-based polymers that contain epoxy groups or organic polymer particles coated with or modified with epoxy groups or particles coated with, dispersed in, or modified with epoxy-groups-containing polymers.

Mixtures of various epoxy resins may also be used in the compositions of the invention. Epoxy resins may be selected from the group consisting of alkylene oxides, alkenyl oxides, glycidyl esters, glycidyl ethers, epoxy novolacs, copolymers of acrylic acid esters of glycidol and copolymerizable vinyl compounds, polyurethane polyepoxides, and mixtures thereof.

Preferably, the epoxy resins contain moieties of the glycidyl, diglycidyl or polyglycidyl ether type. Such epoxy resins may be obtained, for example, by the reaction of a hydroxyl functionality (for example but not limited to dihydric or polyhydric phenols or aliphatic alcohols including polyols) with an epichlorohydrine-functionality. As referred to herein, dihydric phenols are phenols containing at least two hydroxy groups bonded to the aromatic ring (also referred to as "aromatic" hydroxy groups) of a phenol or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups. Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

It is preferred that the at least one epoxy resin comprises at least one aromatic moiety. Preferably, the at least one epoxy resin comprises repeating units derived from bisphenol A and epichlorohydrine, bisphenol F and epichlorohydrine or a combination thereof.

Preferred epoxy resins include epoxy resins containing or consisting of glycidyl ethers or polyglycidyl ethers of monohydric, dihydric or polyhydric phenols, such as for example, but not limited to bisphenol A, bisphenol F, including polymers comprising repeating units of these phenols. Preferred epoxy resins include epoxy novolacs. Epoxy novolacs are the reaction product of an epoxy group-introducing agent, such as for example epichlorohydrin, with a condensation product of a mono- di or polyhydric phenol (which may be alkylsubstituted (e.g. cresol) or non-substituted) and an aldehyde, such as for example, formaldehyde. Typical epoxy novolacs are polymers containing glycidyl ether groups and further comprising repeating units derived from bisphenol F or another reaction product of a phenol with an aldehyde. The phenol may be monohydric, dihydric or trihyidric and may be non-substituted or alkyl substituted.

Instead of, or in addition to, the aromatic epoxy resins described above also their fully or partially hydrogenated derivatives (i.e. the corresponding cycloaliphatic compounds) may be used.

The epoxy resins may be liquid at room temperature or solid. Typically the epoxy resins may have a viscosity of from about 400 mPa·s at 20° C. to about 40,000 mPa·s at 50° C. Preferably, the resin has a viscosity of at least 8,000 mPa s at 20° C. up to 5,000 mPa s at 50° C.

The epoxy resin preferably does not contain an —$NH_2$ or —$NH_3^+$ functionality. More preferably, the epoxy resin preferably does not contain an aromatic amine moiety, such as for example a unit derived from an aminophenol.

Examples of commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co); diglycidyl ether of bisphenol F (e.g. EPICLON 830 available from Dainippon Ink and Chemicals, Inc. or D.E.R.-354 from Dow Chemical Co, Schwalbach/Ts., Germany); silicone resins containing diglycidyl epoxy functionalities; flame retardant epoxy resins (e.g. DER 580, a brominated bisphenol type epoxy resin available from Dow Chemical Co.); Other epoxy resins based on bisphenols are commercially available under the trade designations EPIKOTE (Hexion Speciality Chemicals, Rosbach, Germany), or EPILOX (Leuna Epilox GmbH, Leuna, Germany). Epoxy novolacs are available under the trade designation D.E.N. from Dow Chemical Co, Schwalbach/Ts., Germany, such as for example D.E.N 431 (a novolac resin with an average epoxy functionality of 2.8 and a viscosity of from 1100 to 1700 mPa s at 51.7° C.), D.E.N. 425 a novolac resin with an average epoxy functionality of 2.5 and a viscosity of from 9500 to 12500 mPa s at 25° C., D.E.N. 438 a novolac resin with an average epoxy functionality of 3.6 and a viscosity of from 3100 to 4000 mPa s at 51.7° C.

Preferably, the curable void filler composition as described herein comprise the at least one epoxy resin in an amount of from 5 to 30 wt.-%, preferably of from 7 to 27 wt.-%, more preferably of from 8 to 25 wt.-%, even more preferably of from 9 to 22.5 wt.-%, based on the total weight of the composition.

Epoxy Curing Agent:

The curable void filler compositions according to the present disclosure comprise at least one epoxy curing agent comprising a carboxylic acid anhydride compound. Thus, the curable void filler compositions as described herein may also contain mixtures and combinations of carboxylic acid anhydrides and other epoxy curing agents. Epoxy curing agents are well-known in the art and refer to compounds that react with the oxirane ring of the epoxide to cause cross-linking. Epoxy curing agents are known in the art also as epoxide hardeners and accelerators. In the art, the term "curing agent" often denotes an epoxide hardener that is predominantly used to carry out the cross-linking agent, i.e. it is present in the hardening system as the major component (i.e. in major amounts). The term "accelerating agent" has been used in the art for compounds that are also able to cross-link epoxides but that are present in smaller amounts than the curing agents, such that the cross-linking network predominantly contains units derived from the curing agent as compared to units derived from the accelerating agent. Typical accelerators known in the art include boron trifluoride or trichloride amine complexes, imidazoles, imidazole derivatives, imidazole-like compounds and the like. Specific examples include, for example, 2-(2-(2 methylimidazolyl)-ethyl)-4,6-diamino-s-triazine.

Carboxylic acid anhydrides are known hardeners in the field of epoxy resin-based curable compositions. Preferably, the carboxylic acid anhydrides as described herein are phthalic acid anhydrides, of which tetrahydroxy phthalic acid anhydrides, hexahydroxy phthalic acid anhydrides or norbomenephthalic acid anhydrides are preferred. Methylnorbomenephthalic anhydride and methyl-tetrahydrophthalic anhydride are particular preferred.

Furthermore, the epoxy curing agent may also comprise at least one aliphatic amine, preferably containing at least one primary amine residue and may be branched, cyclic or acyclic.

The aliphatic amines as described herein may be linear or branched amines of the general structure:

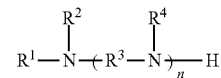

wherein
the residues $R^1$, $R^2$, and $R^4$, independently from each other, may represent hydrogen or a hydrocarbon (such as an alkyl) or an alkoxy or a polyoxyalkyl residue. $R^3$ represents a hydrocarbon, an alkylether or a polyether alkyl residue. More preferably $R^3$ is a polyetheralkyl residue. Preferably, the residues $R^1$, $R^2$, and $R^4$ are chosen such that the amine contains at least one or two primary amine groups;

n represents an integer.

Suitable polyether amines include those that can be derived from polypropylene oxide or polyethylene oxide.

It is preferred that the residues and integers are chosen such that the amines exhibit a melting point of from about 30° C. up to about 100° C., preferably from about 40° C. up to about 90° C., more preferably from about 60° C. to about 80° C. This is particularly advantageous with regard the processability and the shelf-life of the curable compositions as described herein as well as the mechanical properties of the cured void fillers obtained therefrom. The amines as described above are commercially available, for example, within the JEFFAMINE series from Huntsman Chemicals, or within the ANCAMINE series from Airproducts.

It is preferred that the curable void filler compositions according to the present disclosure comprise the at least one epoxy curing agent comprising a carboxylic acid anhydride in an amount of from 5 to 45 wt.-%, preferably of from 10 to 40 wt.-%, more preferably of from 15 to 35 wt.-%, even more preferably of from 20 to 30 wt.-%, based on the total weight of the composition.

In addition, the curable void filler compositions as described herein may further comprise at least one curing additive. This curing additive is also able to cross-link epoxides, but is present in a much smaller amount than the above-described epoxy curing agent and may add to the curing speed of the composition. Accordingly, curing additives as described herein are also known in the art as "curing accelerators". Typical curing additives known in the art include boron trifloride or trichloride amine complexes, imidazoles, imidazole derivatives, imidazole-like compounds and the like. Preferred herein are Specific examples include, for example, 2-(2-(2 methylimidazolyl)-ethyl)-4,6-diamino-s-triazine.

It is preferred that the curable void filler compositions as described herein comprise the at least one epoxy curing additive in an amount of from 0.01 to 10 wt.-%, preferably of from 0.05 to 5 wt.-%, more preferably of from 0.1 to 2 wt.-%, based on the total weight of the composition.

Alkaline Earth Oxides and Alkaline Oxides:

The curable void filler compositions according to the present disclosure comprise at least one alkaline earth oxide and/or at least one alkaline oxide. This has the effect that advantageous hot/wet resistance as well as high mechanical strength and strong bonds to composite materials may be achieved. In particular, the curable void filler compositions as described herein may exhibit advantageous properties when phenolic resin containing sheets, i.e. prepregs, are used in lightweight composite honeycomb structures. Accordingly, the composite structures obtained may be less prone to delamination between core filler and phenolic resin materials, may exhibit better processability such as cutting and drilling. Thus, additional costs for repair of composite articles may be avoided. This is in particular advantageous where lightweight honeycomb composite structures are used, e.g. in the aerospace industry.

Preferably, the at least one alkaline oxide is selected from Lithium oxide, Sodium oxide and potassium oxide, and the at least one earth alkaline oxide is selected from Magnesium oxide, Calcium oxide, Caesium oxide, and combinations thereof. It was found that alkaline earth oxides, in particular Magnesium oxide and Calcium oxide provided the best results with regard to mechanical properties of the cured void filler obtained by curing the curable void filler compositions as described herein. Accordingly, it is preferred that the curable void filler compositions as described herein comprise alkaline earth oxides, preferably Magnesium oxide and/or Calcium oxide, of which Calcium oxide is particularly preferred.

Preferably, the curable void filler compositions according to the present disclosure comprise the at least one alkaline oxide and/or the at least one earth alkaline oxide in an amount of from 0.1 to 12 wt.-%, preferably of from 0.2 to 10 wt.-%, more preferably of from 0.3 to 5 wt.-%, based on the total weight of the composition.

The curable void filler compositions according to the present disclosure may further comprise at least one reactive epoxy diluent which may help to control the flow characteristics and further add to the mechanical properties of the cured void filler. These reactive epoxy diluents are typically monomeric epoxy-containing molecules, i.e. they contain at least one epoxy (or oxirane-) moiety. Preferred reactive epoxy diluents are diglycidyl ethers of a saturated or unsaturated compound. Preferably, the at least one reactive epoxy diluent is selected from diglycidyl ether of resorcinol, diglycidyl ether of cyclohexane dimethanol, diglycidyl ether of neopentyl glycol, diglycidyl ether of 1,6-hexanediol, triglycidyl ether of trimethylolpropane, and combinations and mixtures thereof. Examples of suitable commercially available reactive epoxy diluents are compounds from the Epodil series (such as Epodil 757) from Airproducts and compounds from the Heloxy HD series from Hexion.

Preferably, the curable void filler compositions as described herein comprise the at least one reactive epoxy diluent in an amount of from 1 to 20 wt.-%, preferably of from 2 to 17 wt.-%, more preferably of from 3 to 15 wt.-%, based on the total weight of the composition.

In order to comply with corresponding requirements in the aerospace industry, the curable void filler compositions according to the present disclosure may further comprise at least one flame retardant. That is, the at least one flame retardant as described herein may also referred to as a flame retardant system comprising at least two or at least three flame retardant compounds. In this regard, it is preferred that the at least one flame retardant is selected from phosphorous compounds, organohalogens, metal hydroxides, preferably aluminium hydroxide and magnesium hydroxide, huntite, hydromagnesite and borates, and expandable compounds, and combinations and mixtures thereof. Preferably, the phosphorous compounds comprise inorganic phosphorous compounds, preferably red phosphorous containing compound, preferably red phosphorous powder, optionally in the form of a blend of a stabilised micro encapsulated red phosphorous in an epoxy resin carrier, and organic phosphorous compounds, preferably organophosphorous compounds, preferably selected from organophosphates, preferably triphenyl phosphate, resorcinol bis (diphenylphosphate), bisphenol A diphenylphosphate, tricresyl phosphate, organophosphonates, preferably dimethyl(methylphosphonate), and phosphinates, preferably metal phosphinates, preferably metal selected from aluminium, iron, kalium, calcium, sodium, preferably phosphinates selected from diethyl phosphinate, dimethylphosphinate, dipropylphosphinate, dibutylphosphinate, diphenylphosphinate, preferably aluminium diethylphosphinate. Examples of commercially available compounds suitable for use as described herein include Exolit OP1230 (an organic phospinate) from Clariant, Exolit RP 6500 (micro-encapsulated red phosphorous in epoxy resin carrier) from Clariant and Saytex BT 93 (ethylene bis-tetrabromophthalimide) from Albemarle Corporation.

With regard to the expandable compound, it is preferred that this compound is an expandable carbon compound, preferably an expandable graphite intercalation compound. Graphite intercalation compounds are compounds in which organic compounds are inserted into the graphene planes of the graphene planes structure of graphite. Graphite intercalation compounds are also known under the designation expandable graphite and may be manufactured by treating graphite, such as natural graphite flake, with an intercalant of, e.g. a solution of sulfuric acid and nitric acid. The crystal structure of the graphite reacts to form a compound of graphite and the intercalant. Common methods for manufacturing particles of expandable graphite or graphite intercalation compounds are described, inter alia, in U.S. Pat. No. 3,404,061 and CA 2 334 274 A1, the disclosure of which is incorporated herein by reference. It is known that upon exposure to high temperatures, the expandable graphite expands in dimension as much as 80 or more times of their original volume in an accordion-like fashion in a direction perpendicular to the crystalline planes of the graphite. Exfoliated graphite particles may be vermiform in appearance, and are therefore commonly referred to as "worms". Without wanting to being bound by theory, it is assumed that said "worms" of expanded expandable graphite may act as a barrier to fire, both mechanically and because of their insulating properties. Examples of graphite intercalation compounds (i.e. expandable graphite) which may be advantageously used in the present disclosure are commercially available under the designations ES 100 C10, ES 250 B5 and ES 350 F5 from Graphit Kropfmhl/hVAMG Mining AG or Expand C.

With regard to obtain good flame retardant properties while maintaining good mechanical properties of the cured void filler it is preferred that the curable void filler compositions as described herein comprise the at least one fire retardant in an amount of from 5 to 40 wt.-%, preferably of from 7 to 35 wt.-%, and more preferably of from 10 to 30 wt.-%, based on the total weight of the composition.

Filler Material:

The curable void filler compositions as described herein may further comprise at least one filler material. Preferred are filler materials capable of reducing the density of the compositions. Capable of reducing the density of the composition as used herein means the filler has a lower density than the composition without the filler. Preferably, the compositions may comprise 1 to 50 wt.-%, preferably 5 to 45 wt.-%, more preferably 10 to 40 wt.-%, even more preferably 15 to 35 wt.-% of such a filler. Fillers capable of reducing the density of the precursor includes low density inorganic fillers, (i.e., fillers having a density of between 0.1 to 0.5 g/cm$^3$), low density organic fillers (i.e., fillers having a density of between 0.01 to 0.30 g/cm$^3$) but low density inorganic fillers are preferred over organic fillers because the letter tend to negatively influence the compressive strength. A combination of organic and inorganic fillers may be used but the inorganic low density fillers are preferably used in excess over the organic fillers.

The low-density inorganic fillers are preferably selected from inorganic particles, inorganic microspheres and in particular hollow inorganic microspheres. The microspheres may be selected from a variety of materials including by way of example glass, silica, ceramic (including sol-gel derived) or zirconia.

The fillers are preferably selected so that they allow for an advantageous density of the cured composition without sacrificing its compressive strength. The hollow inorganic microspheres exhibit a density of less than 0.5 g/cm$^3$, more preferably of between 0.12 and 0.42 g/cm$^3$. The fillers may have an average particle size typically of less than 500 µm, or between 10 and 100 µm.

Preferred hollow inorganic microspheres include glass microspheres which are commercially available, for example, from 3M Company under the trade designation Glass bubbles D32 or Scotchlite D32/4500.

Unexpanded organic hollow microsphere fillers are available, for example, from Akzo Nobel under the trade designation "Expancel®". Unexpanded organic hollow microspheres are sometimes also referred to as expandable organic microballoons which are also available, for example, from Lehmann and Voss, Hamburg, Germany under the trade designation Micropear. Pre-expanded organic hollow microspheres are commercially available, for example, from Lehmann & Voss, Hamburg, Germany under the trade designation Dualite.

The concentration and the nature of the fillers used in the curable compositions is preferably selected such that the density of the cured composition is less than 1 g/cm$^3$, more preferably less than 0.9 g/cm$^3$ and most preferably between 0.5 and 0.8 g/cm$^3$.

The composition of the present invention may comprise further ingredients, adjuvants, which may be used to further regulate rheological properties or mechanical properties, adapt the visual appearance of the compositions or may help to prevent premature degradation of the compositions. These additional materials include, for example, fillers other than those described above, thixotropic agents, reactive diluents, pigments, antioxidants, adhesion promoters and the like.

Reactive diluents and thixotropic agents may be added to control the flow characteristics of the adhesive composition.

Thixotropic agents typically are particulate materials having particle sizes of less than 50 nm. Preferred thixotropic agents include fumed silica. Thixotropic agents are commercially available under the trade designation Cab-O-Sil from Cabot, Schwalbach im Taunus, Germany, or Aerosil from Degussa Evonik GmbH, Frankfurt, Germany.

Further materials include wetting agents, which are preferably selected from the group consisting of titanates, silanes, zirconates, zircoaluminates, phosphoric ester(s) and mixtures thereof. The wetting agent improves the mixability and processability of the composition and can also enhance the composition's handling characteristics. An especially useful wetting agent is commercially available as Coatex DO-UP6L from Coatex, Genay, France. The concentration of the wetting agent component comprising one or more wetting agents is typically lower than 6 percent by weight and more preferably not more than 5 percent by weight.

Pigments may include inorganic or organic pigments including ferric oxide, brick dust, carbon black, titanium oxide and the like.

The compositions may further comprise toughening agents. Toughening agents are polymers, other than the epoxy resins, capable of increasing the toughness of cured epoxy resins compared to the same composition not containing them (the difference in amount in such comparison studies is made up by the epoxy resin) and which are otherwise treated identically. Typical toughening agents include, for example, core-shell polymers or liquid butadiene-nitrile rubbers.

Preferably, the curable void filler compositions according to the present disclosure comprise (a) at least one epoxy resin in an amount of from 5 to 30 wt.-%, preferably of from 7 to 27 wt.-%, more preferably of from 8 to 25 wt.-%, even more preferably of from 9 to 22.5 wt.-%, based on the total weight of the composition;

(b) at least one epoxy curing agent comprising an anhydride compound in an amount of from 5 to 45 wt.-%, preferably of from 10 to 40 wt.-%, more preferably of from 15 to 35 wt.-%, even more preferably of from 20 to 30 wt.-%, based on the total weight of the composition;

(c) at least one alkaline oxide and/or at least one alkaline earth oxide in an amount of from 0.1 to 12 wt.-%, preferably of from 0.2 to 10 wt.-%, more preferably of from 0.3 to 5 wt.-%, based on the total weight of the composition;

(d) optionally, at least one reactive epoxy diluent in an amount of from 1 to 20 wt.-%, preferably of from 2 to 17 wt.-%, more preferably of from 3 to 15 wt.-%, based on the total weight of the composition;

(e) optionally, at least one epoxy curing additive in an amount of from 0.01 to 10 wt.-%, preferably of from 0.05 to 5 wt.-%, more preferably of from 0.1 to 2 wt.-%, based on the total weight of the composition;

(f) optionally, at least one fire retardant compound in an amount of from 5 to 40 wt.-%, preferably of from 7 to 35 wt.-%, and more preferably of from 10 to 30 wt.-%, based on the total weight of the composition;

(g) optionally, at least one filler material in an amount of from 1 to 50 wt.-%, preferably of from 5 to 45 wt.-%, more preferably of from 10 to 40 wt.-%, even more preferably of from 15 to 35 wt.-%.

The curable compositions of the disclosure can be readily prepared by a number of techniques. For example, the various components may be added under ambient conditions to a suitable mixing vessel, such as a Mogul mixer. The vessel is preferably cooled to prevent reaction of the components during preparation and to facilitate removal of any heat generated during manufacture. Preferably the curable composition (also referred to herein as "precursor") is mixed at a temperature of less than 35° C. Additionally, slow mixing speeds are generally used to help prevent heat build-up in the mixer. Mixing is continued until the components form a homogeneous mixture, after which time the precursor is removed from the mixer.

The precursors can be applied by conventional application equipment such as pumps and dispensing units. The precursors of the present invention preferably are one-part compositions, i. e. they already comprise the hardener component as compared to two-part composition, where the hardening components are kept separated from the epoxy resin until use of the compositions. One-part precursors of the present invention preferably exhibit a good shelf life time at room temperature. One-part compositions contain a reactive system and are therefore, preferably kept at low temperatures for storage. A good shelf life at room temperature as referred to herein can be determined by measuring the time (from preparing the composition or from the time it has reached room temperature (20° C.) after having been kept at −18° C.) until the composition thickens such that it becomes more difficult or impossible to apply. A slow rate of thickening is acceptable. A composition is considered to have a good shelf life at room temperature, if its extrusion rate (as measured according to the methods described below) is greater than 60 g/min after storage for 5 days at room temperature.

The present disclosure further provides a cured void filler, obtained by curing the curable void filler compositions as described herein. As will be further elaborated below, curing may be carried out by heating the curable composition.

Preferably, the cured void filler exhibits a cured density according to ISO 1183 of not more than 1.0, preferably of not more than 0.9, more preferably of not more than 0.8, even more preferably of not more than 0.75. It is also preferred that the cured void filler exhibits a compressive strength according to ISO 604 at 23° C. of at least 25 MPA, preferably of at least 30 MPA, and more preferably of at least 35 MPa. Similarly, it is preferred that the void filler exhibits a compressive strength according to ISO 604 at 80° C. of at least 12 MPa, preferably of at least 14 MPa, more preferably of at least 16 MPa, even more preferably of at least 18 MPa. The cured void filler preferably also exhibits a compressive strength according to ISO 604 at −55° C. of at least 30 MPa, preferably of at least 35 MPa, more preferably of at least 45 MPA, even more preferably of at least 47 MPa. Moreover, the cured void filler preferably exhibits an extrusion viscosity according to AITM 7-003 of at least 10 g/15 s, preferably of at least 12 g/15 s, more preferably of at least 15 g/15 s. Finally, it is preferred that the cured void filler exhibits a smoke density according to AITM 2.0007A of not more than 220, preferably of not more than 200, more preferably of not more than 180, and even more preferably of not more than 160. With the cured void filler as described herein exhibiting at least one or preferably a combination or even all of the above properties, a property profile highly desirable for applications in the aerospace industry is obtained.

The curable void filler compositions as described herein are particular useful as core filler for honeycomb structures, in particular honeycombs used in aircrafts and in particular honeycombs used in the interior of an aircraft, for example in interior walls or in floor panels. Typical embodiments are capable of withstanding the forces encountered when used at the interface of a pressurized and non-pressurized zone of a passenger aircraft. Accordingly, the present disclosure further provides a composite article comprising a honeycomb structure comprising a plurality of cells filled with a curable void filler composition or a cured void filler as described herein.

Typically, the honeycomb structure has a honeycomb frame containing a plurality of cells. The cells in a honeycomb structures may typically range from 0.4 cm up to 15 cm in at least one or all three dimensions (maximum length, maximum width and maximum height of the cell). The cells may be rectangular or hexagonal or may have any other shape. The honeycomb frame surrounding the cells is typically made of metal, for example but not limited to steel and aluminium. The honeycomb frame may also be not metallic and contain fibers or fibers composites, like glass fiber composite or carbon fiber composites.

It is preferred that the composite article further comprises at least one layer covering at least part of an external surface of said honeycomb structure, wherein at least part of an external surface of the at least one layer has a common interface with the cells filled with the compositions or cured void fillers as described herein. The covering layer may be in form of a sheet or a film. Preferably, said layer comprises a composite material containing fibers embedded in a resin. It is preferred that the resin comprises at least one epoxy resin and/or at least one phenolic resin. The fibers are preferably selected from carbon fibers, glass fibers, polymeric fibers, ceramic fibers, metal fibers, and mixtures thereof.

In some embodiments at least one of the external surface of the honeycomb is at least partially covered by a layer comprising a composite material containing fibers embedded in a resin, e.g. a prepreg (preimpregnated fiber materials). The resin may be an epoxy resin as described above or a phenolic resin as described below and including blends or combinations thereof. The layer may be, for example, in the form of a coating or a sheet. The sheet may be laminated or adhesively bonded or fixed to the honeycomb structure mechanically or is co-cured with the cell filler. Phenolic resins as referred to herein are polymeric materials based on the reaction-product of one or more phenol and one or more aldehyde, typically formaldehyde. In the latter case the phenolic resins are also referred to as phenol-formaldehyde resins. Phenolic resins also include novolac resins. Novolacs comprise the reaction product of an epoxy group-introducing agent, such as for example epichlorohydrine, with a condensation product of a mono- di or polyhydric phenol and an aldehyde, such as for example, formaldehyde. The phenol may be alkylsubstituted (e.g. cresol) or non-substituted). Typical epoxy novolacs are polymers containing glycidyl ether groups and further comprising repeating units derived from the condensation of bisphenol F, bisphenol A or another phenol or polyphenol with an aldehyde.

The fibers of the composite materials include, for example, inorganic fibers and organic fibers. Inorganic fibers include glass fibers, ceramic fibers and carbon fibers. Organic fibers include polyamide fibers, for example aromatic polyamides like aramide fibers.

Commercial phenolic prepregs include, for example, HexPly®93 and HexPly®200 available from Hexcel Corporation, Stamford, Conn., USA.

Further provided herein is a method for producing a composite article, comprising
- (I) Providing a honeycomb structure comprising a plurality of cells;
- (II) Filling the cells of the honeycomb structure with the curable void filler composition as described herein;
- (III) Optionally, covering at least one external surface of the honeycombs structure with at least one layer, preferably a sheet comprising a composite material containing fibers embedded in a resin as described herein;
- (IV) Curing the void filler composition.

Preferably, the composite material in step (III) is a phenolic prepreg sheet as described herein. In this regard, it is preferred to co-cure the void filler composition and the sheet in step (IV). Curing can be carried out as described above in connection with the composite article according to the present disclosure.

Furthermore, the present disclosure provides a use of the curable void filler composition as described herein for the manufacture of composite articles comprising a honeycomb structure. Preferably, the composite articles are lightweight composite articles for aerospace industries.

Similarly, the present disclosure provides a use of the curable void filler composition as described herein in manufacturing processes for lightweight sandwich composite structures, preferably for aerospace, automotive, and commercial transportation industries.

Examples

The present disclosure is further described without however wanting to limit the disclosure thereto. The following examples are provided to illustrate certain embodiments but are not meant to be limited in any way. Prior to that some test methods used to characterize materials and their properties will be described. All parts and percentages are by weight unless otherwise indicated.

Materials Used:

| Raw Materials - Trade Name | Description/Function |
| --- | --- |
| Epilox 1850 | Bis Phenol A/F Epoxy Resin |
| Disparlon 6500 | Polyamide Wax/Thixotropic agent |
| Heloxy HD | Reactive diluent |
| Epodil 757 | Reactive diluent |
| Omicure BC120 | Boron Trichloride Amine Complex/Cure Accelerator |
| Exolit OP 1230 | Organic phosphorus salt/Flame retardant |
| Expan C | Expandable graphite/Flame retard |
| Kronos 2310 | Titanium Dioxide/Filler |
| Exolit RP 6500 | Flame retardant |
| Aluminium hydroxide | Aluminium trihydrate/Flame retardant |
| Saytex BT 93-W | 1,2-Bis-(tetrabromophthalimido)ethane/Flame retardant |
| ZB 467 | Zinc Borate - Flame retardant |
| MTHPA - Liquid Anhydride | Methyl-Tetrahydrophthalic Anhydride |
| Aerosil R202 | Fumed Silica/Thixtropic agent |
| GBB S38HS | Glass bubbles |
| Calcium Oxide | Calcium oxide |

Test Methods
Hot/Wet Conditioning

A honeycomb structure (Aramid paper, phenolic resin coated, 4 mm cell size, NOMEX DuPont) was filled with the core filler compositions according to the examples. Both sides of the filled honeycomb were covered by phenolic prepreg (PY6540, PY 6547, ISOVOLTA). The sandwich structure is then cured in heat press for 50 min 140° C. After curing the sandwich structure is then subjected to hot/wet conditioning at 70° C. temperature and 85% relative humidity for 1000 h. The sample were visually inspected for delamination & resin leakage.

Extrusion Rate

The processability of the precursor of the low-density epoxy-based composition was evaluated at room temperature (23° C.) by extruding it through standard equipment using the following procedure. An air driven application pistol (available from SEMCO, East Kilbride, U.K) was fitted with a 150 ml disposable cartridge and a nozzle having an aperture of 4 mm. The disposable cartridge was filled with precursor and by applying an air pressure of 4 bars the low-density epoxy composition was extruded. The extrusion rate was determined by measuring the quantity extruded in 15 seconds.

Measurements were made immediately after the precursor was prepared (initial extrusion rate). Each precursor was evaluated 3 times and the results averaged.

Additional measurements were done after the precursor was kept 3 days (or 5 days, respectively) at a temperature of 23 (2) ° C. and 50% relative humidity. The test results provided below are averages from three measurements.

Cured Density

Cured density of samples obtained by curing precursors according to the examples and comparative examples as described herein was determined according to ISO 1183.

Compressive Strength 200 g of the precursor were cast into a release-coated mould having the dimensions of 12.5 mm (height)×12.5 mm (width)×25 mm (length) and being open on one major side. The mould was placed in a forced air oven. The oven temperature was raised from 23° C. to 140° C. with heating rate of 3-5° C./min. Then the temperature was held at 140° C. for 50 min and then the temperature was allowed to cool down to 23° C. over a period of 45 minutes.

All test specimens were compressed along their 25 mm axis at a rate of 0.5 mm/min by using a Zwick Model Z050 Tensile Tester (Zwick GmbH & CO., Ulm, Germany), equipped with heating capability.

Compressive strength was measured at 23° C. (room temperature), −55° C. and 80° C. The test specimens were preconditioned in the heated or cooled equipment for at least 30 minutes before testing at −55° C. and 80° C.

Six samples were measured for each epoxy composition. The results were averaged and recorded in MPa.

Optical Smoke Density

A sheet having a thickness of 3-5 mm was prepared by pouring the composition into an aluminium release-treated mould and curing it in an air forced oven using the same curing cycle from 23° C. to 140° C. as described previously for the compressive strength test. Samples having the dimensions of 3 mm×75 mm×75 mm were then cut from this large sheet. The surface of one side was abraded with sandpaper to insure that the exposed resin was representative of the overall composition.

The NBS smoke density chamber (NBS=National Bureau of Standards) was used to measure smoke density. This test method is described in detail in JAR/FAR Part 25, amdt. 25-66, Appendix F, Part V (JAR/FAR=Joint Aviation Requirements/Federal Aviation Regulations); see also Airbus Directive ABD 0031, "Fireworthiness Requirements, Pressurised Section of Fuselage", Issue D, September 2002, section 5.4 "smoke-density". A sample of the epoxy-based composition was placed over a gas flame of specific dimension. Smoke generated in the chamber was measured by light transmission of a vertical light beam through the air space in the oven.

Three samples of each epoxy-based composition were tested and the results averaged.

Vertical Flammability Test:

A sheet having a thickness of 3-5 mm was prepared by pouring the composition into an aluminium release-treated mould and curing it in an air forced oven using the same curing cycle from 23° C. to 140° C. as described previously for the compressive strength test. Samples having the dimensions of 3 mm×75 mm×300 mm were then cut from this large sheet.

The flame retardancy (FR) was tested in a vertical configuration accordingly to FAR-25, Appendix F, Part 1 (a) (1) (ii) [Version 01-2012] for 12 seconds and 60 seconds, respectively. The tested material must be self-extinguishing. The average burn length may not exceed 6 inches and the average flame time after removal of the flame source may not exceed 15 seconds. Drippings from the test specimen may not continue to flame for more than an average of 3 seconds after falling.

Preparation of Examples and Comparative Examples

Epoxy-based curable compositions were prepared by combining in each case the compounds listed below in Table 1 in a 2.0 litre mechanical mogul type mixer commercially available by Linden GmbH, Germany. In Table 1, all concentrations are given as weight percent.

A temperature of less than 35° C. was maintained during the mixing process, using water-cooling. The epoxy resin was added first and mixed at 20 to 40 rpm with the other ingredients wherein the ingredients are added one after each other and are mixed for about 20 minutes until a homogeneous blend was achieved before the next ingredient was added. In a final step the homogeneous blend was degassed by applying a 100 mbar vacuum for 5 minutes. The precursor formulations were stored −18° C.

All precursor formulations were pastes having a smooth and uniform consistence.

TABLE 1 composition of examples 1-3 and comparative examples 1 and 2 (amounts in % by weight)

| | Ex. 1 | Ex. 2 | Ex. 3 | Comp. Ex. 1 | Comp. Ex. 2 |
|---|---|---|---|---|---|
| Epoxy resin | 19.90 | 10.6 | 12.2 | 20.5 | 12.2 |
| Thixotropic agent | 3.16 | 0.8 | 0.8 | 3.25 | 0.8 |
| Epoxy diluent | 6.80 | 9.3 | 10 | 7 | 10 |
| Cure accelerator | 0.73 | 0.4 | 0.4 | 0.75 | 0.4 |
| Flame retardant & Fillers | 15.05 | 26 | 25.7 | 15.5 | 26.7 |
| Liquid Anhydride | 27.18 | 21.7 | 21.5 | 28 | 21.5 |
| Glass bubbles | 24.27 | 29.7 | 28.9 | 25 | 28.4 |
| Calcium Oxide | 2.91 | 1.5 | 0.5 | 0 | 0 |
| sum | 100.00 | 100 | 100 | 100 | 100 |

TABLE 2

Properties of cured void filler compositions of examples 1-3 and comparative examples 1 and 2

| Test | Ex. 1 | Ex. 2 | Ex. 3 | Comp. Ex. 1 | Comp. Ex. 2 |
|---|---|---|---|---|---|
| Hot/Wet (1000 h at 70° C. & 85% R.HH) | No resin leakage | No resin leakage | No resin leakage | Strong leakage | Strong leakage |
| Cured density | 0.65 g/cc | 0.72 g/cc | 0.73 g/cc | 0.68 g/cc | 0.70 g/cc |
| Compressive strength at −55° C. | 60 MPa | 90 MPa | 55 MPa | 60 MPa | 54 MPa |
| Compressive strength at 23° C. | 50 MPa | 70 MPa | 47 MPa | 50 MPa | 48 MPa |
| Compressive strength at 80° C. | 20 MPa | 24 MPa | 18 MPa | 18 MPa | 17 MPa |
| Extrusion after 5 days at RT | 20 g | 15 g | 18 g | 22 g | 18 g |
| 60 s vertical burn test | Pass | Pass | Pass | Pass | Pass |
| 12 s vertical burn test | Pass | Pass | Pass | Pass | Pass |
| Smoke Density | 125 | 130 | 100 | 183 | 140 |

The invention claimed is:

1. A method for producing a honeycomb composite article that resists delamination at a honeycomb structure/void filler interface, the method comprising:
   (I) providing a honeycomb structure comprising a plurality of cells;
   (II) filling said cells of said honeycomb structure with a void filler composition comprising:
      (a) at least one epoxy resin;
      (b) at least one epoxy curing agent comprising a carboxylic acid anhydride compound; and
      (c) at least one alkaline oxide and/or at least one alkaline earth oxide, the at least one alkaline oxide including lithium oxide, sodium oxide, or potassium oxide, and the at least one alkaline earth oxide including calcium oxide;
   (III) optionally, covering at least one external surface of said honeycomb structure with at least one layer; and
   (IV) curing said void filler composition.

2. The method according to claim 1, wherein the carboxylic acid anhydride compound is a phthalic acid anhydride selected from methylnorbornenephthalic anhydride, methyl-tetrahydrophthalic anhydride and methyl-hexahydrophthalic anhydride.

3. The method according to claim 1, comprising the at least one alkaline oxide and/or the at least one alkaline earth oxide in an amount of from 0.1 to 15 wt.-%, based on the total weight of the composition.

4. The method according to claim 1, further comprising at least one reactive epoxy diluent that is a diglycidyl ether of a saturated or unsaturated compound.

5. The method according to claim 1, comprising at least one filler material selected from hollow inorganic particles and silica, and combinations and mixtures thereof.

6. The method according to claim 1, comprising
   (a) at least one epoxy resin in an amount of from 5 to 30 wt.-% based on the total weight of the composition;
   (b) at least one epoxy curing agent comprising an anhydride compound in an amount of from 5 to 45 wt.-%, based on the total weight of the composition;
   (c) at least one alkaline oxide and/or at least one alkaline earth oxide in an amount of from 0.1 to 12 wt.-%, based on the total weight of the composition;
   (d) optionally, at least one reactive epoxy diluent in an amount of from 1 to 20 wt.-%, based on the total weight of the composition;
   (e) optionally, at least one epoxy curing additive in an amount of from 0.01 to 10 wt.-%, based on the total weight of the composition;
   (f) optionally, at least one fire retardant compound in an amount of from 5 to 40 wt.-%, based on the total weight of the composition;
   (g) optionally, at least one filler material in an amount of from 1 to 50 wt.-%.

7. A honeycomb composite article made by the method according to claim 1.

8. The honeycomb composite article according to claim 7, wherein the void filler exhibits a compressive strength according to ISO 604 at 80° C. of at least 12 MP.

9. A composite article produced according to the method of claim 1.

10. The composite article according to claim 9, further comprising at least one layer covering at least part of an external surface of said honeycomb structure, wherein at least part of the surface of the at least one layer has a common interface with the cells filled with the curable void filler composition or the cured void filler.

11. The composite article according to claim 10, wherein said layer covering at least part of an external surface of said honeycomb structure comprises a composite material containing fibers selected from carbon fibers, glass fibers, polymeric fibers, metal fibers, and mixtures thereof, embedded in a resin comprising at least one epoxy resin and/or at least one phenolic resin.

12. The method according to claim 1, wherein the at least one layer of the composite material comprises a resin, and in step (IV) the resin of the at least one layer of the composite material is cured.

13. The method of claim 1, wherein the void filler composition comprises calcium oxide.

* * * * *